(12) United States Patent
Dobbie

(10) Patent No.: US 11,216,994 B2
(45) Date of Patent: Jan. 4, 2022

(54) METHOD AND APPARATUS FOR RENDERING A VISUAL REPRESENTATION OF A FONT GLYPH

(71) Applicant: Will Dobbie, Sunnyvale, CA (US)

(72) Inventor: Will Dobbie, Sunnyvale, CA (US)

( * ) Notice: Subject to any disclaimer, the term of this patent is extended or adjusted under 35 U.S.C. 154(b) by 13 days.

(21) Appl. No.: 16/642,859

(22) PCT Filed: Aug. 28, 2018

(86) PCT No.: PCT/IB2018/056537
§ 371 (c)(1),
(2) Date: Feb. 27, 2020

(87) PCT Pub. No.: WO2019/043562
PCT Pub. Date: Mar. 7, 2019

(65) Prior Publication Data
US 2021/0074038 A1    Mar. 11, 2021

(30) Foreign Application Priority Data
Aug. 28, 2017 (AU) .................... 2017903461

(51) Int. Cl.
*G06T 11/00* (2006.01)
*G06T 11/20* (2006.01)

(52) U.S. Cl.
CPC .................. *G06T 11/203* (2013.01)

(58) Field of Classification Search
CPC ........ G06T 11/203; G06T 11/20; G06T 11/60; G09G 5/24; G09G 5/243; G06F 40/109
See application file for complete search history.

(56) References Cited

U.S. PATENT DOCUMENTS

| | | | |
|---|---|---|---|
| 2007/0030272 A1* | 2/2007 | Dowling | G06T 11/20 345/467 |
| 2007/0070071 A1 | 3/2007 | Terazono et al. | |
| 2010/0271382 A1* | 10/2010 | Kato | G06T 11/203 345/582 |
| 2011/0273454 A1 | 11/2011 | Zimmer | |
| 2016/0364892 A1 | 12/2016 | Huang et al. | |

OTHER PUBLICATIONS

International Search Report and Written Opinion dated Dec. 4, 2018 in related International Application No. PCT/IB2018/056537.
Dobbie, W., "GPU text rendering with vector textures," Jan. 2, 2016 (retrieved from http://wdobbie.com/post/gpu-text-rendering-with-vector-textures) pp. 1-9.
Ray, N. et al., "Vector texture maps on the GPU," Jul. 2008 (retrieved from https://www.researchgate.net/publication/248311661_Vector_texture_maps_on_the_GPU), pp. 1-6.

* cited by examiner

*Primary Examiner* — Hau H Nguyen

(57) ABSTRACT

A method for rendering a visual representation of a font glyph, the method comprising computing a set of straight or curved lines, wherein the straight or curved lines correspond to edges of the font glyph, computing a grid of cells overlaying the straight or curved lines, and then rendering each pixel by generating an ellipse, computing a ray that intersects a centre of the ellipse, calculating a coverage value, and using the coverage value to calculate a colour value for each pixel.

16 Claims, 6 Drawing Sheets

METHOD AND APPARATUS FOR RENDERING A VISUAL REPRESENTATION OF A FONT GLYPH

RELATED APPLICATIONS

The present application is a United States National Phase under 35 U.S.C. § 371 of International Application No. PCT/IB2018/056537 entitled "METHOD AND APPARATUS FOR RENDERING A VISUAL REPRESENTATION OF A FONT GLYPH" and filed on Aug. 28, 2018, which claims the benefit of and priority to Australian Patent Application No. 2017903461 filed Aug. 28, 2017, the entire disclosures of each of which are hereby incorporated by reference herein.

FIELD

The present invention relates to a method and apparatus for rendering a font glyph on a computer visual display.

BACKGROUND

A computer font consists of a set of graphical characters or symbols, referred to as glyphs, that are rendered on a computer visual display for displaying readable text and information.

Font atlases are commonly used to render fonts. A font atlas consists of a two-dimensional bitmap image, normally stored as a texture, containing a set of glyphs that make up the font packed together in a grid arrangement. When a particular piece of text needs to be displayed, the glyphs corresponding to the characters of the text are retrieved from the atlas and rendered as images onto the computer display. This method has a number of drawbacks. In particular, a glyph will appear blurred due to bilinear interpolation once the size of the displayed glyph exceeds the resolution at which it is stored in the atlas. In practice, a font atlas must be generated in advance for each screen resolution that the font will be displayed. This consumes valuable storage and memory resources.

As an alternative to using font atlases, a glyph can be rendered using signed distance fields. In this approach, rather than storing the glyph in a bitmap image, the distances between the centre of the glyph and various points around the glyph's boundaries are stored in a data structure as a set of vectors. When a glyph needs to be displayed, the distance vectors for the glyph are retrieved from the data structure and used to draw the glyph on the visual display. Whilst signed distance fields allow glyphs to be rendered with crisp edges at any resolution, sharp corners of the glyph become rounded off using this method which causes the true shape and appearance of the glyph to be distorted. Effectively, to render a font glyph accurately at any resolution, a set of distance vectors must be created for each and every resolution, which leads to the same storage problems experienced when using font atlases.

In this context, there is a need for improved font glyph rendering techniques.

SUMMARY

According to the present invention, there is provided a method for rendering a visual representation of a font glyph, the method comprising:
  performing a pre-processing procedure comprising:
    computing a set of straight or curved lines, wherein the straight or curved lines correspond to edges of the font glyph;
    computing a grid of cells overlaying the straight or curved lines; and
    subdividing the cells so that each cell is not intersected by more than a maximum quantity of the straight or curved lines; and
  performing a rendering procedure for each pixel of a computer visual display comprising:
    generating an ellipse corresponding to the relevant pixel;
    performing a lookup operation using the grid to determine edges of the font glyph that intersect the ellipse;
    computing a ray that has opposed first and second ends and intersects a centre of the ellipse and opposed first and second edges of the ellipse;
    initializing a coverage value to zero;
    when the ray enters the font glyph at an entry point, adding to the coverage value the distance between the entry point and the second end of the ray and calculating a glancing angle between the ray and the entry point;
    when the ray exists the font glyph at an exit point, subtracting from the coverage value the distance between the exit point and the second end of the ray; and
    using the coverage value to calculate a colour value for each pixel; and adjusting a size of the ellipse based on the glancing angle.

The second end of the ray in the rendering procedure may coincide with the second edge of the ellipse.

The pre-processing procedure may further comprise computing a set of vertices for the set of straight or curved lines, assigning an index to each vertex in the set of vertices and then for each cell in the grid, storing the index of each vertex in the set of vertices that corresponds to a straight or curved line intersecting the relevant cell.

The set of vertices may be an ordered set of vertices, wherein the ordered set of vertices is used during the rendering procedure to determine if each intersection between the ray and the font glyph is an entry or exit point.

The set of vertices may be ordered in a clockwise direction such that for each vertex in the set of vertices, an interior section of the font glyph is always disposed to the right hand side of the straight or curved line relating to the vertex, and an exterior section of the font glyph is always disposed to the left hand side of the straight or curved line relating to the vertex.

The method may further comprise converting the grid of cells into a texture after performing the pre-processing procedure, and using the texture to perform the look-up operation of the rendering procedure.

The curved lines computed in the pre-processing procedure may comprise Bezier curves.

The rendering procedure may further comprise applying a transform to the set of straight or curved lines to convert them into a coordinate system whereby the ellipse has a diameter of unit length.

The pre-processing procedure may further comprise computing a flag for each cell of the grid, wherein the flag indicates whether the relevant cell is positioned inside or outside of the font glyph, wherein the rendering procedure further comprises using each flag to determine whether a centre of the ellipse is located inside or outside of the font glyph.

The method may further comprise using the coverage value to calculate an alpha value of the pixel.

The rendering procedure may further comprise computing a plurality of rays for each ellipse, wherein each ray is inclined at a unique angle relative to all other rays in the plurality of rays, computing a plurality of coverage values using the plurality of rays and calculating the colour value of the relevant pixel using an average of the plurality of coverage values.

The pre-processing procedure may be executed on a central processing unit of a computer system.

The rendering procedure may be executed on a graphics processor unit of the computer system.

The rendering procedure may be executed using a fragment shader program executed on the graphics processor unit.

The present invention also provides a system for rendering a visual representation of a font glyph, the system comprising:
a central processing unit configured to:
compute a set of straight or curved lines, wherein the straight or curved lines correspond to edges of the font glyph;
compute a grid of cells overlaying the straight or curved lines; and
subdivide the cells so that each cell is not intersected by more than a maximum quantity of the straight or curved lines; and
a graphics processor unit configured to:
apply a transform to each pixel of a computer visual display to generate an ellipse corresponding to the relevant pixel;
perform a lookup operation using the grid to determine edges of the font glyph that intersect the ellipse;
compute a ray that has opposed first and second ends and that intersects a centre of the ellipse and opposed first and second edges of the ellipse;
initialize a coverage value to zero;
when the ray enters the font glyph at an entry point, add to the coverage value the distance between the entry point and the second end of the ray and calculate a glancing angle between the ray and the entry point;
when the ray exists the font glyph at an exit point, subtract from the coverage value the distance between the exit point and the second end of the ray; and
use the coverage value to calculate a colour value for each pixel; and adjusting a size of the ellipse based on the glancing angle.

The present invention also provides a computer-readable medium storing computer-executable instructions, comprising:
performing a pre-processing procedure comprising:
computing a set of straight or curved lines, wherein the straight or curved lines correspond to edges of the font glyph;
computing a grid of cells overlaying the straight or curved lines; and
subdividing the cells so that each cell is not intersected by more than a maximum quantity of the straight or curved lines; and
performing a rendering procedure for each pixel of a computer visual display comprising:
applying a transform to the relevant pixel to generate an ellipse corresponding to the relevant pixel;
performing a lookup operation using the grid to determine edges of the font glyph that intersect the ellipse;
computing a ray that has opposed first and second ends and intersects a centre of the ellipse and opposed first and second edges of the ellipse;
initializing a coverage value to zero;
when the ray enters the font glyph at an entry point, adding to the coverage value the distance between the entry point and the second end of the ray and calculating a glancing angle between the ray and the entry point;
when the ray exists the font glyph at an exit point, subtracting from the coverage value the distance between the exit point and the second end of the ray; and
using the coverage value to calculate a colour value for each pixel; and adjusting a size of the ellipse based on the glancing angle.

BRIEF DESCRIPTION OF DRAWINGS

Embodiments of the invention will now be described by way of example only with reference to the accompanying drawings, in which.

DESCRIPTION OF EMBODIMENTS

Figure 1:
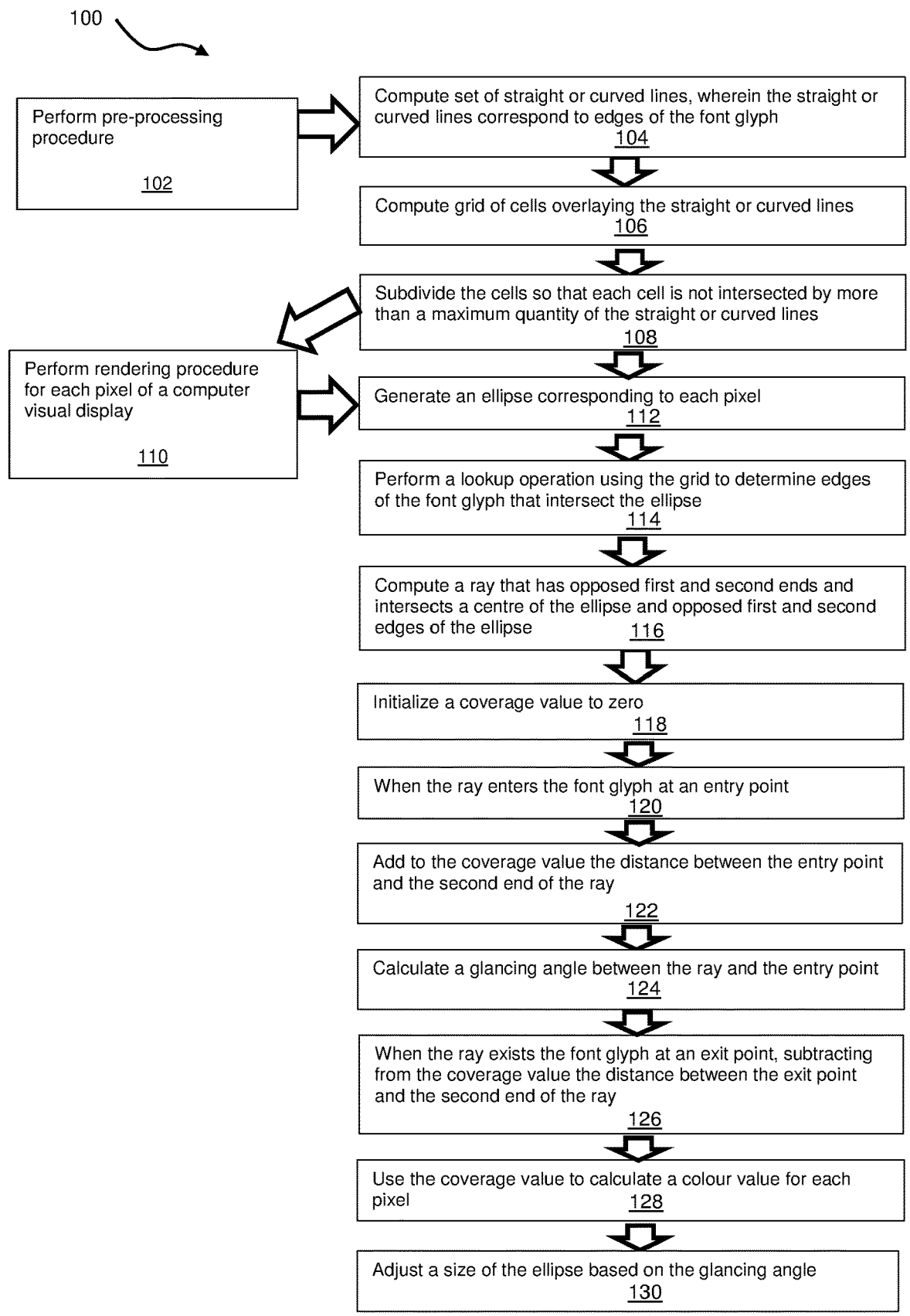
FIG. 1 is a flowchart of a method for rendering a visual representation of a font glyph according to an example embodiment of the invention.

Referring to the drawings, example embodiments of the present invention provide a method 100 for rendering a visual representation of a font glyph. The operations of the method 100 may be implemented by one or more software modules. The one or more software modules may be embodied in a non-transitory computer-readable medium storing computer-executable instructions for performing the operations of the method.

Referring to FIG. 1, the method 100 firstly comprises performing a pre-processing procedure 102 comprising computing a set of straight or curved lines corresponding to edges of the font glyph 104, computing a grid of cells overlaying the straight or curved lines 106 and then subdividing the cells so that each cell is not intersected by more than a maximum quantity of the straight or curved lines 108.

The method further comprises performing a rendering procedure 110 for each pixel of a computer visual display. The rendering procedure 110 comprises applying a transform to the relevant pixel to generate an ellipse corresponding to the relevant pixel 112, performing a lookup operation using the grid to determine edges of the font glyph that intersect the ellipse 114, computing a ray that has opposed first and second ends and that intersects a centre of the ellipse and opposed first and second edges of the ellipse 116, initializing a coverage value to zero 118, when the ray enters the font glyph at an entry point 120 adding to the coverage value the distance between the entry point and the second end of the ray 122 and calculating a glancing angle between the ray and the entry point 124, when the ray exists the font glyph at an exit point, subtracting from the coverage value the distance between the exit point and the second end of the ray 126, using the coverage value to calculate a colour value for each pixel 128 and adjusting a size of the ellipse based on the glancing angle 130.

Figure 2A:
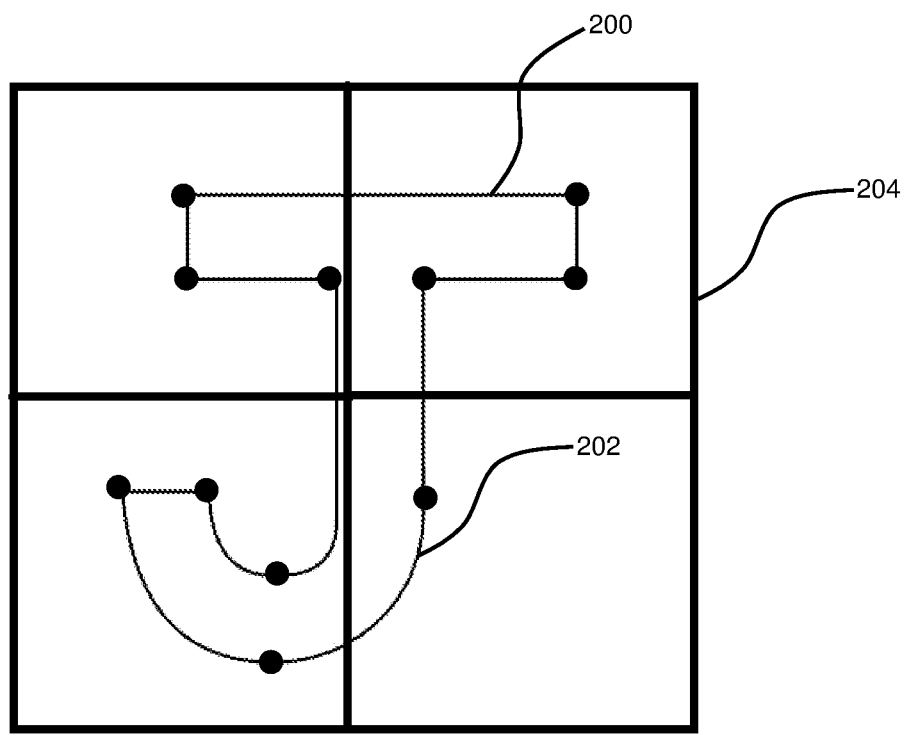
FIGS. 2(a) and (b) illustrate steps comprised in a pre-processing procedure of the method.
Figure 2B:
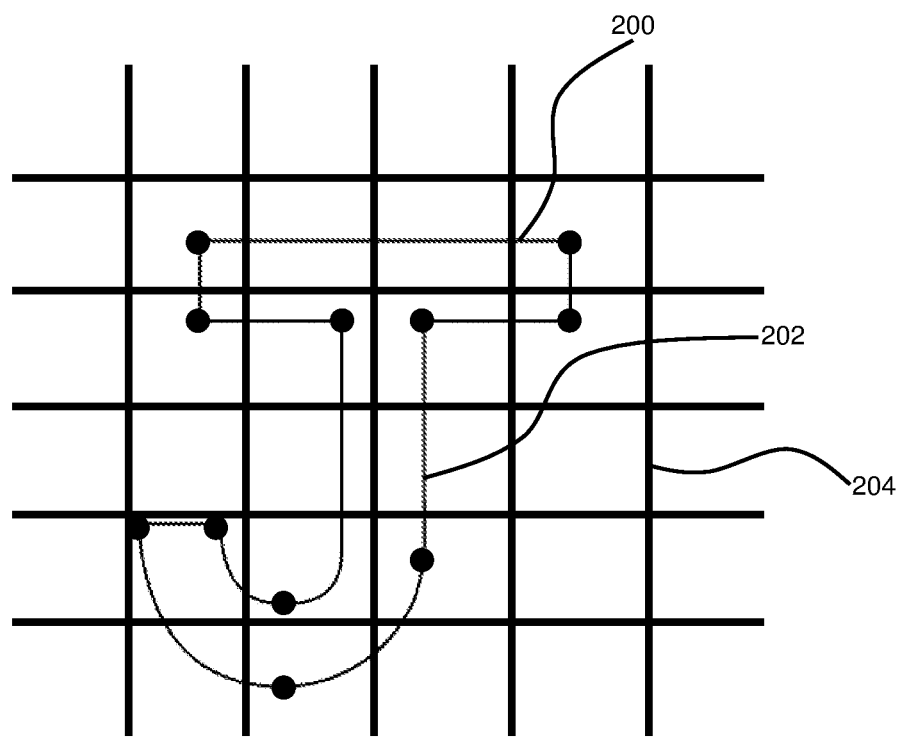

More particularly, referring to FIGS. 2(a) and 2(b), the method begins by performing the pre-processing procedure 102 for an individual font glyph 200 that needs to be rendered. In the example shown, the glyph 200 consists of a capital letter 'J'. The pre-processing procedure 102 only needs to be performed once for the glyph 200 and results in the generation of a set of data that may be used subsequently as part of the rendering procedure 110 each time the glyph 200 needs to be rendered on a computer visual display.

The shape of the glyph 200 is represented by a set of straight and curved lines that, together, delineate a boundary 202 of the glyph 200. For the first step in the pre-processing procedure 102, a set of line segments corresponding to the straight and curved lines of the boundary 202 are computed. Each line segment in the set is computed using a parametric or vector representation of the relevant boundary line. Each line segment may, for example, be a Bezier curve and, preferably, a quadratic or a cubic Bezier curve.

A grid of cells 204 is then computed which, initially, is a two-by-two grid comprising four cells in total. The grid 204 overlays the complete surface area of the glyph 200 including all straight and curved line segments computed for the boundary 202.

The grid 204 is then sub-divided incrementally until each cell of the grid 204 is not intersected by more than a maximum quantity of the straight or curved line segments. For example, in FIG. 2(b) the grid 204 has been subdivided until each cell is not intersected by more than three of the line segments delineating the boundary 202 of the glyph 200.

The line segments that intersect each cell of the grid 204 are stored in the relevant cell. Rather than storing the vertices of the intersecting line segments in the cells, an index may optionally be computed and assigned to each vertex of each line segment comprising the boundary 202. For example, if the line segments are Bezier curves, an index will be computed and assigned to each of the control points of the Bezier curves. For each cell in the grid 204, the indices corresponding to the vertices of the lines that intersect the cell are then stored in the cell.

Optionally, the pre-processing procedure further comprises computing a flag for each cell of the grid 204 and storing the flag in the cell. Each flag indicates whether the relevant cell is positioned inside or outside of the font glyph 200. These flags may be used subsequently in the rendering procedure 110.

After the sub-division process has been completed, the data that represents the generated grid 204 may then be written out into a texture. Converting the data into a texture format advantageously enables the data to be read and used by a graphics processor unit (GPU) of a computer system when the rendering procedure 110 is subsequently performed.

The rendering procedure 110 consists of a sequence of steps that are performed for each and every pixel of a computer visual display that the glyph 200 needs to be rendered onto.

Figure 3A:
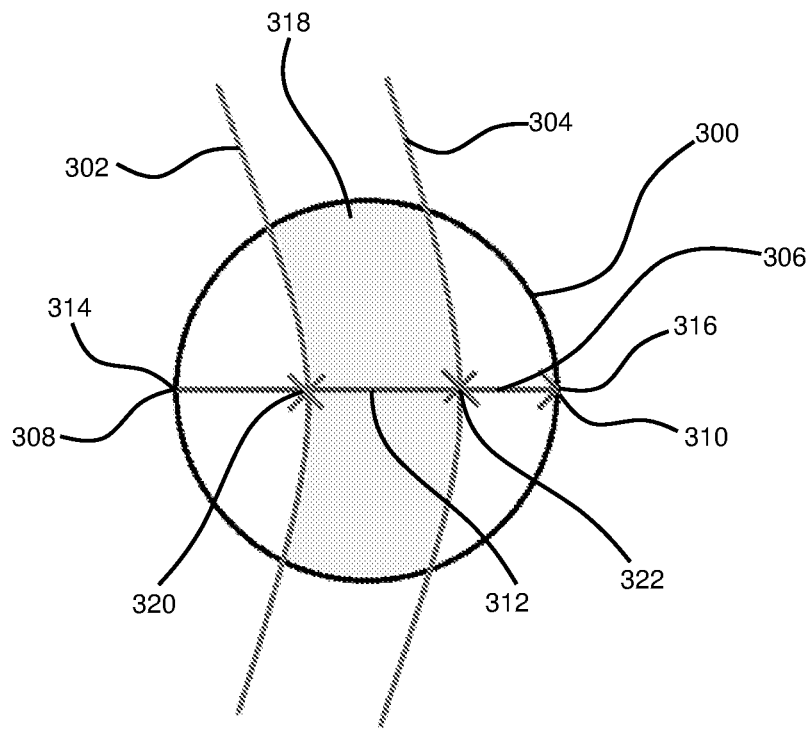
FIGS. 3(a) to 3(d) illustrate steps comprised in a rendering procedure of the method.

Referring to FIG. 3(a), for the first step of the rendering procedure 110 an ellipse 300 is calculated for each pixel of the display. The ellipse 300 that has been generated for the example in FIG. 3(a) has major and minor axis of substantially equal length causing the ellipse 300 to be circular. Optionally, a transform may be applied to the world-space coordinates of the line segments that converts them into a coordinate system whereby the ellipse 300 has unit size—i.e., so that the diameter of the ellipse 300 has a length of 1.

A lookup operation is then performed using the pre-computed grid 204 to identify each of the line segments of the glyph 200 that intersect the ellipse 300. For example, in FIG. 3(a) two substantially curved line segments 302, 304 forming part of the glyph 200 are shown intersecting the ellipse 300.

A ray 306 is then computed that has opposed first and second ends 308, 310. The ray 306 is computed such that it intersects a centre point 312 of the ellipse 300 and also intersects opposed first and second edges 314, 316 of the ellipse 300. In the example shown in FIG. 3(a), the second end 310 of the ray 306 coincides with the second edge 316 of the ellipse 300. The second end 310 may, however, be positioned elsewhere provided always that the position is outside of the perimeter of the ellipse 300.

Once the ray 306 has been computed, a sub-procedure is performed to determine the proportion of the ellipse 300 that is occupied by the glyph 200. For example, in FIG. 3(a) the ellipse 300 that is shown is occupied by the area of the glyph 200 referred to by numeral 318, which is straddled between the two curved line segments 302, 304.

Figure 3B:
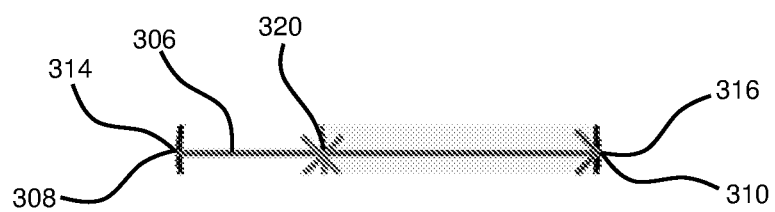
Figure 3C:
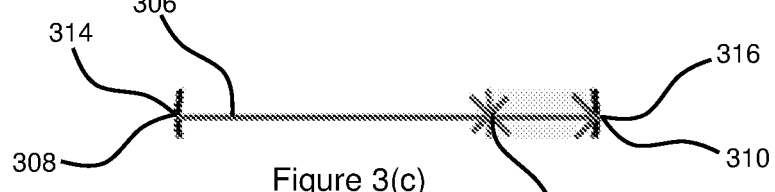
Figure 3D:
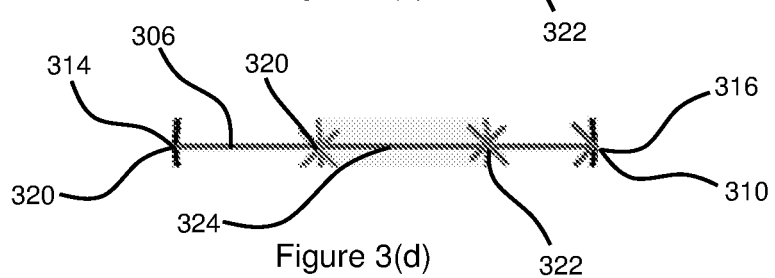

To perform the sub-procedure, a coverage value is firstly initialized to the value zero. The ray 306 is then traversed from its first end 308 to its second end 310. As most clearly shown in FIG. 3(b), each time the ray 306 enters the glyph 200 at an entry point 320, the distance between the entry point 320 and the second end 310 of the ray 306 is added to the coverage value. As shown in FIG. 4(c), each time the ray 306 exists the glyph 200 at an exit point 322, the distance between the exit point 322 and the second end 310 of the ray 306 is subtracted from the coverage value. As a result of this addition and subtraction process, the resultant coverage value that is computed represents the distance between the ray entry and exit points 320, 322, as indicated in FIG. 3(d) by reference numeral 324. The coverage value, therefore, represents a numerical estimate of the proportion of the ellipse 300 that is occupied by the glyph 200.

When the ray 306 is being traversed, it is necessary to identify whether each intersection between the ray 306 and the glyph 200 is an entry or exit point of the glyph 200. To enable this, during the pre-processing procedure 102 the list of vertices that comprise the line segments of the boundary 202 of the glyph 200 may be arranged into a specific order. Preferably, the vertices are ordered such that they follow the boundary 202 of the glyph 200 in a clockwise direction. In this arrangement, an interior section of the glyph 200 is always disposed to the right hand side of each line segment and an exterior of the font glyph 200 is always disposed to the left hand side of each line segment.

When traversing the ray 306, it is possible that the ellipse 300 may fall completely inside or outside of the boundary 202 of the glyph 200 and, therefore, have no intersections with the ellipse 300 at all. These situations may be detected using the flags that are optionally computed during the pre-processing procedure 102 and stored in the cells of the grid 204. Alternatively, in examples of the method where the vertices of each glyph 200 boundary are ordered in a clockwise manner, these situations may be detected by keeping track of the closest intersection between the ray 306 and the ellipse 300 when performing the ray 306 traversal. At the point of intersection, the inside of the glyph 200 will always be on the right hand side of the relevant boundary line segment.

In the example shown in FIG. 3(a), the glancing angle that is formed between the ray 306 and each line segment 302, 304 is substantially perpendicular. As a result of this, the coverage value that is calculated represents a good approximation of the proportion of the ellipse 300 that is occupied by the glyph 200. In other situations, however, the shape of the ellipse 300, and the shape of the relevant line segments of the glyph 200 intersecting the ellipse 300, may be different.

Figure 4:
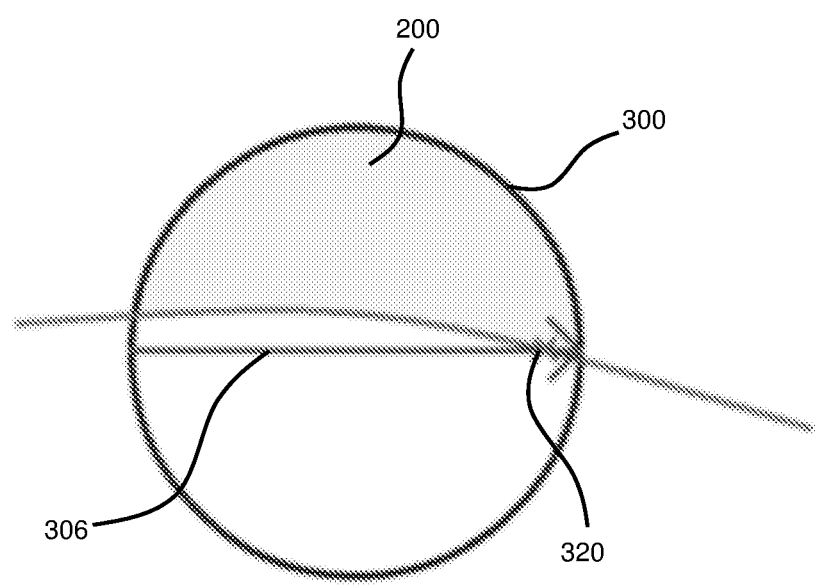
FIG. 4 illustrates a further step of the rendering procedure of the method.

For example, in FIG. 4 a situation is shown where the glancing angle formed between the ray 306 and the glyph 200 at an entry point 320 may not be perpendicular. This will, in turn, cause the coverage value that is calculated to be an inaccurate estimate of the proportion of the ellipse 300 occupied by the glyph 200. To solve this problem, for each entry point 320 that is identified during the rendering procedure 110, the glancing angle between the ray 306 and the relevant line segment of the glyph 200 is calculated. If the glancing angle falls within one or more particular ranges (for example, if the angle is particularly acute or obtuse) then the size of the ellipse 300 may be increased so that the ellipse 300 covers a larger portion of the glyph 200. The ray 306 traversal sub-procedure is then repeated for the resized ellipse 300 in order to calculate a more accurate coverage value.

For the final step in the method, the final coverage value that is produced is used to calculate a colour value of the pixel. The coverage value may, for example, be used to calculate an alpha value of the pixel. The pixel can then be rendered onto the computer visual display.

If the ellipse 300 used during the rendering procedure 110 is optionally scaled to unit length after the lookup operation is performed, then the coverage value that is calculated using the ray transversal process automatically falls within the range 0 to 1. This advantageously enables the coverage value to be used directly for calculating pixel colour value.

The rendering procedure is repeated for each and every pixel of the display resulting in the complete font glyph 200 being rendered.

Figure 5:
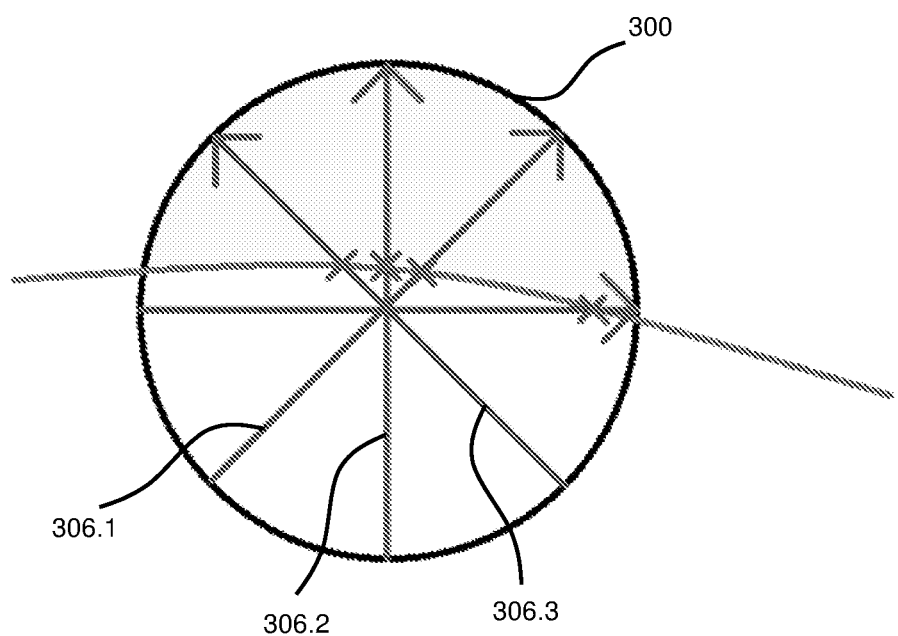
FIG. 5 illustrates a further step that may be comprised in the rendering procedure of the method.

FIG. 5 illustrates further steps that may be comprised in the rendering procedure in an alternative embodiment of the disclosed method. In this embodiment, a plurality of rays 306 are computed for each ellipse 300. Each ray 306 is inclined at a unique angle relative to all other rays in the plurality. Each of the rays 306 is traversed individually which results in a plurality of coverage values being calculated. The colour value of the relevant pixel is then calculated using an average of the plurality of coverage values.

Whilst three rays 306 are used in the example in FIG. 5, an alternative number of rays may be generated and traversed. Generally, increasing the number of rays leads to a corresponding increase in the accuracy of the average coverage value that is calculated.

The disclosed method advantageously enables glyphs to be rendered with crisp edges at any resolution. Unlike signed distance fields, the effectiveness of the disclosed method is also not impaired by glyph's having sharp edges. Rendering accuracy can also be improved selectively under the disclosed method by calculating and traversing a higher number of rays during the rendering procedure.

Figure 6:
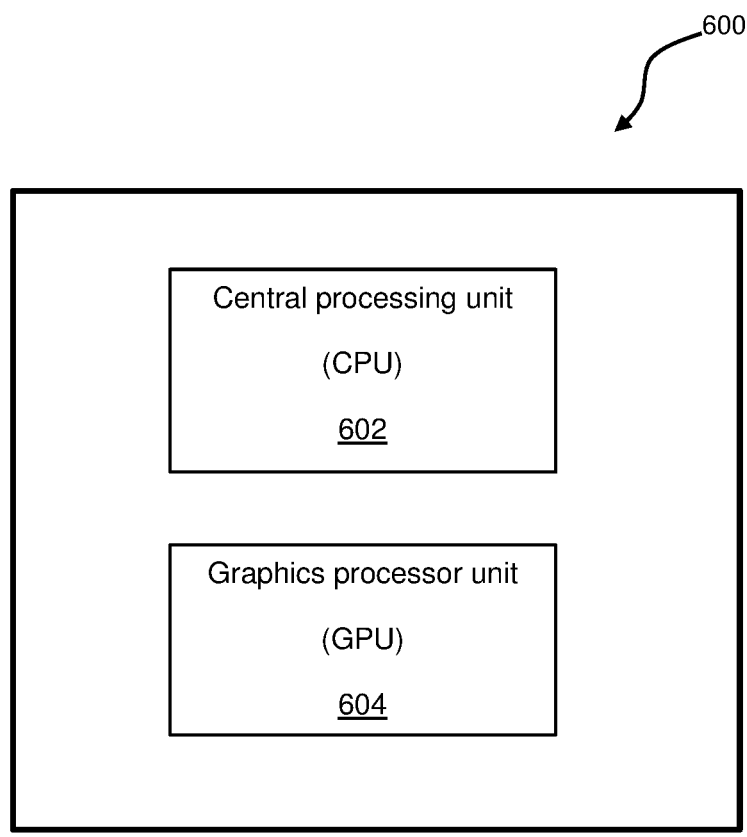
FIG. 6 is a schematic diagram of a system for implementing example embodiments of the invention.

The method 100 for rendering a visual representation of a font glyph according to the present invention may be implemented using the system 600 shown in FIG. 6. The system 600 comprises a central processing unit 602 and a graphics processor unit 604. The central processing unit 602 is configured to perform the pre-processing procedure 102 of the method 100 and the graphics processor unit 604 is configured to perform the rendering procedure 110 of the method 100.

The pre-processing procedure 102 of the method 100 only needs to be performed by the central processing unit 602 once for the font glyph. Once performed, the data contained in the grid 204 that is generated may be transferred to the graphics processor unit 604 and subsequently used for the rendering procedure 110 each time the glyph needs to be rendered on a computer display.

The steps comprised in the rendering procedure 110 can advantageously be executed by the graphics processor unit 604 in real-time. The rendering procedure 110 is, in particular, well suited for commercially-available graphics cards having graphics processor units that operate on multiple screen pixels in parallel.

The rendering procedure 110 may, for example, be executed by the graphics processor unit 604 using a fragment shader program residing on fast, local storage coupled to the graphics processor unit 604.

Embodiments of the present invention provide rendering methods useful for displaying font glyphs on computer visual displays.

For the purpose of this specification, the word "comprising" means "including but not limited to", and the word "comprises" has a corresponding meaning.

The above embodiments have been described by way of example only and modifications are possible within the scope of the claims that follow.

The invention claimed is:

1. A method for rendering a visual representation of a font glyph, the method comprising:
   performing a pre-processing procedure comprising:
      computing a set of straight or curved lines, wherein the straight or curved lines correspond to edges of the font glyph;
      computing a grid of cells overlaying the straight or curved lines; and
      subdividing the cells so that each cell is not intersected by more than a maximum quantity of the straight or curved lines; and
   performing a rendering procedure for each pixel of a computer visual display comprising:
      generating an ellipse corresponding to the relevant pixel;
      performing a lookup operation using the grid to determine edges of the font glyph that intersect the ellipse;
      computing a ray that has opposed first and second ends and intersects a centre of the ellipse and opposed first and second edges of the ellipse;
      initializing a coverage value to zero;
      when the ray enters the font glyph at an entry point, adding to the coverage value the distance between the entry point and the second end of the ray and calculating a glancing angle between the ray and the entry point;
      when the ray exists the font glyph at an exit point, subtracting from the coverage value the distance between the exit point and the second end of the ray;
      using the coverage value to calculate a colour value for each pixel; and
      adjusting a size of the ellipse based on the glancing angle.

2. The method according to claim 1, wherein the second end of the ray in the rendering procedure coincides with the second edge of the ellipse.

3. The method according to claim 1, wherein the pre-processing procedure further comprises:
   computing a set of vertices for the set of straight or curved lines;

assigning an index to each vertex in the set of vertices; and for each cell in the grid, storing the index of each vertex in the set of vertices that corresponds to a straight or curved line intersecting the cell.

4. The method according to claim 3, wherein:

the set of vertices is an ordered set of vertices; and the ordered set of vertices is used during the rendering procedure to determine if each intersection between the ray and the font glyph is an entry or exit point.

5. The method of claim 4, wherein the set of vertices are ordered in a clockwise direction such that for each vertex in the set of vertices:

an interior section of the font glyph is always disposed to the right hand side of the straight or curved line relating to the vertex; and an exterior section of the font glyph is always disposed to the left hand side of the straight or curved line relating to the vertex.

6. The method according to claim 1, further comprising:

converting the grid of cells into a texture after performing the pre-processing procedure; and using the texture to perform the look-up operation of the rendering procedure.

7. The method according to claim 1, wherein the curved lines computed in the pre-processing procedure comprise Bezier curves.

8. The method according to claim 1, wherein the rendering procedure further comprises applying a transform to the set of straight or curved lines to convert them into a coordinate system whereby the ellipse has a diameter of unit length.

9. The method according to claim 1, wherein:

the pre-processing procedure further comprises computing a flag for each cell of the grid that indicates whether each cell is positioned inside or outside of the font glyph; and the rendering procedure further comprises using each flag to determine whether a centre of the ellipse is located inside or outside of the font glyph.

10. The method according to claim 1, further comprising using the coverage value to calculate an alpha value of the pixel.

11. The method according to claim 1, wherein the rendering procedure further comprises:

computing a plurality of rays for each ellipse, wherein each ray is inclined at a unique angle relative to all other rays in the plurality of rays;

computing a plurality of coverage values using the plurality of rays; and calculating the colour value of the relevant pixel using an average of the plurality of coverage values.

12. The method according to claim 1, wherein the pre-processing procedure is executed on a central processing unit of a computer system.

13. The method according to claim 12, wherein the rendering procedure is executed on a graphics processor unit of the computer system.

14. The method of claim 13, wherein the rendering procedure is executed using a fragment shader program executed on the graphics processor unit.

15. A system for rendering a visual representation of a font glyph, the system comprising:

a central processing unit configured to:

compute a set of straight or curved lines, wherein the straight or curved lines correspond to edges of the font glyph;

compute a grid of cells overlaying the straight or curved lines; and subdivide the cells so that each cell is not intersected by more than a maximum quantity of the straight or curved lines; and a graphics processor unit configured to:

apply a transform to each pixel of a computer visual display to generate an ellipse corresponding to the relevant pixel;

perform a lookup operation using the grid to determine edges of the font glyph that intersect the ellipse;

compute a ray that has opposed first and second ends and that intersects a centre of the ellipse and opposed first and second edges of the ellipse;

initialize a coverage value to zero;

when the ray enters the font glyph at an entry point, add to the coverage value the distance between the entry point and the second end of the ray and calculate a glancing angle between the ray and the entry point, when the ray exists the font glyph at an exit point, subtract from the coverage value the distance between the exit point and the second end of the ray;

use the coverage value to calculate a colour value for each pixel; and adjusting a size of the ellipse based on the glancing angle.

16. A non-transitory computer-readable medium storing computer-executable instructions, comprising:

performing a pre-processing procedure comprising:

computing a set of straight or curved lines, wherein the straight or curved lines correspond to edges of the font glyph;

computing a grid of cells overlaying the straight or curved lines; and subdividing the cells so that each cell is not intersected by more than a maximum quantity of the straight or curved lines; and performing a rendering procedure for each pixel of a computer visual display comprising:

applying a transform to the relevant pixel to generate an ellipse corresponding to the relevant pixel;

performing a lookup operation using the grid to determine edges of the font glyph that intersect the ellipse;

computing a ray that has opposed first and second ends and intersects a centre of the ellipse and opposed first and second edges of the ellipse;

initializing a coverage value to zero;

when the ray enters the font glyph at an entry point, adding to the coverage value the distance between the entry point and the second end of the ray and calculating a glancing angle between the ray and the entry point;

when the ray exists the font glyph at an exit point, subtracting from the coverage value the distance between the exit point and the second end of the ray;

using the coverage value to calculate a colour value for each pixel; and adjusting a size of the ellipse based on the glancing angle.

* * * * *